US000001074H

United States Statutory Invention Registration [19]

[11] Reg. Number: H1074

Lazaroff et al. [43] Published: Jul. 7, 1992

[54] BACTERIO-ELECTRIC LEACHING OF METALS

[75] Inventors: Norman Lazaroff, Vestal, N.Y.; Patrick R. Dugan, Idaho Falls, Id.

[73] Assignee: The United States of America as represented by the United States Department of Energy, Washington, D.C.

[21] Appl. No.: 486,039

[22] Filed: Feb. 27, 1990

[51] Int. Cl.[5] ..... C25C 1/00; C25C 1/12; C07G 17/00; C01B 31/02

[52] U.S. Cl. ..... 204/105 R; 204/106; 204/114; 204/112; 204/130; 204/131; 204/136; 204/140; 423/461; 423/DIG. 17; 44/622; 435/267; 435/262; 435/281

[58] Field of Search ..... 204/105 R, 106, 112, 204/114, 130, 131, 136, 140; 423/461, DIG. 17; 44/622; 435/262, 267, 281

[56] References Cited

U.S. PATENT DOCUMENTS

| | | | |
|---|---|---|---|
| 3,982,995 | 9/1976 | Yen et al. | 208/11 R |
| 4,043,884 | 8/1977 | Yen et al. | 204/131 |
| 4,193,854 | 3/1980 | Drnevich et al. | 204/152 |
| 4,206,288 | 6/1980 | Detz et al. | 423/DIG. 17 |
| 4,392,402 | 8/1983 | Ghosh | 48/209 |
| 4,711,849 | 12/1987 | Rawlings et al. | 435/91 |
| 4,748,118 | 5/1988 | Rawlings et al. | 435/172.3 |
| 4,775,627 | 10/1988 | Attia et al. | 435/262 |
| 4,822,413 | 4/1989 | Pooley et al. | 75/118 R |
| 4,845,034 | 4/1989 | Menger et al. | 435/167 |

OTHER PUBLICATIONS

Srivastava et al., "Coal Bioprocessing: A Research Needs Assessment", Chemical Engineering Progress (after Mar. 27, 1989).

Lazaroff and Dugan, "Bacterio-Electric Removal of Metals from Coal", Bioprocessing of Coals, Tyson's Corner, Va., Aug. 13-18, 1989.

Lararoff and Dugan, "Bacterio-Electric Separation of Leached Metals from Coals and Sulfide Minerals", 197th American Chemical Society Mtg., Apr. 9-14, 1989.

Lazaroff, Dugan, and Wey, "Review of Biological Processing and Interactions with Coal", Annual Program Review, Jan. 30, 1990.

*Primary Examiner*—Robert L. Stoll
*Assistant Examiner*—C. Harris
*Attorney, Agent, or Firm*—Hugh W. Glenn; Robert J. Fisher; William R. Moser

[57] ABSTRACT

The separation of cationic materials from an ore body is assisted by the application of an electric potential, and resulting current, to the ore body, in association with iron or sulphur oxidizing bacteria. The combined process induces migration of cationic metals to a cathode suspended within the ore body so that the cationic metal can be preferentially separated from the ore body.

4 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 7
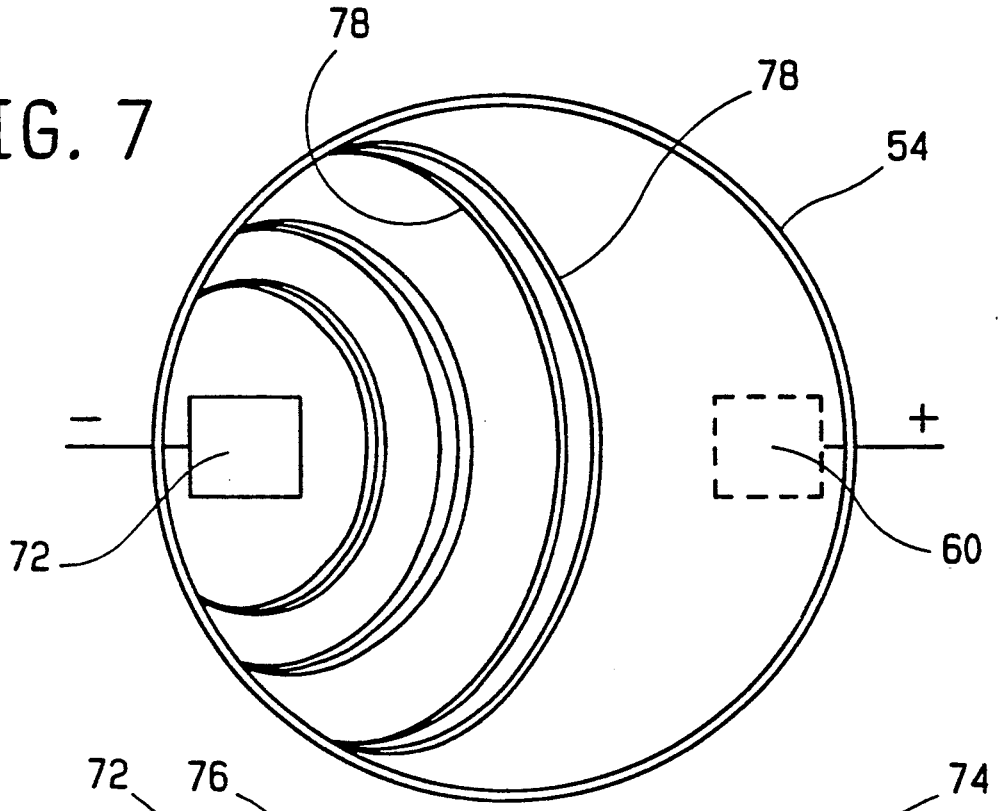
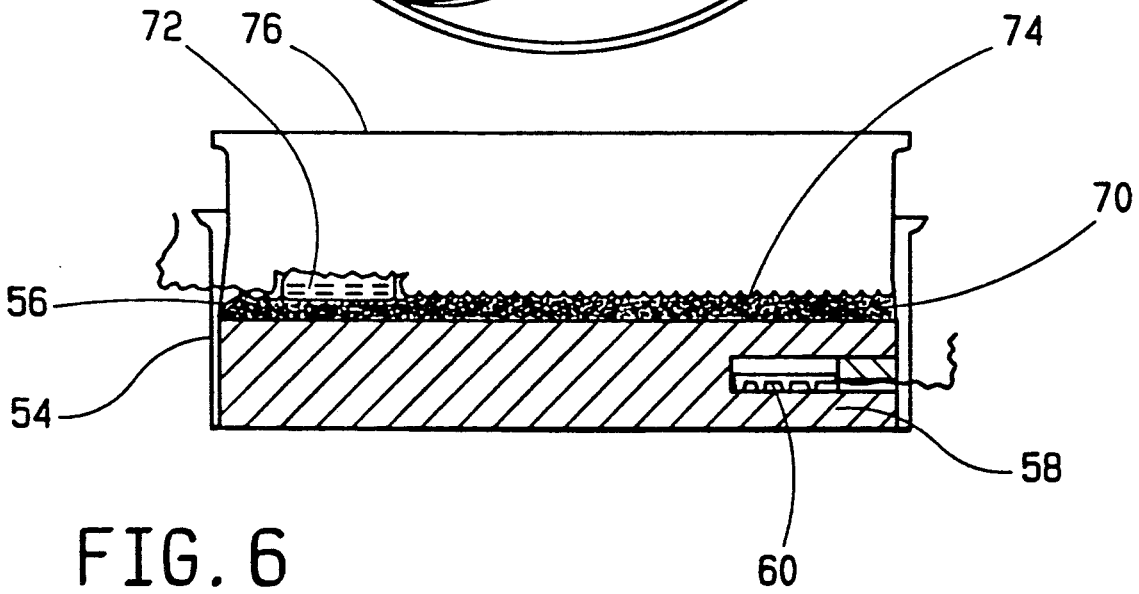
FIG. 6

BACTERIO-ELECTRIC LEACHING OF METALS

CONTRACTUAL ORIGIN OF THE INVENTION

The United States Government has rights in this invention pursuant to Contract No. DE-AC07-76ID01570 between the United States Department of Energy and EG&G Idaho, Inc.

FIELD OF THE INVENTION

The present invention relates to the biological beneficiation of an ore body or fossil fuel utilizing an applied electrical field in conjunction with living microorganisms and/or their metabolic by-products to effect the release of metallic ions or mineral components from the ore body.

BACKGROUND OF THE INVENTION

Processes for removing sulphur from coal, or for extracting desirable metals from an ore body, are well-known. Coal desulfurization is highly desirable in that it is believed that combustion of coal, and specifically high-sulphur content coals, is a contributing factor to acid rain and other environmental problems. Numerous methods for desulfurizing coal have been attempted. Physical separation, bacterial oxidation and chemical processes can all be demonstrated to produce the desired effect in laboratory or pilot plant scale tests. However, each of these processes suffers because they are either too expensive or too difficult to accomplish on the massive scale involved. Physical separation processes are difficult because of the small particle size necessary. Bacterial oxidation suffers because of the long exposure times required (on the order of 5-15 days). Chemical processes suffer from the expense of the large quantity of chemicals required.

For example, U.S. Pat. No. 4,775,627 discloses a process whereby pyrite particles and high-sulphur content coal are modified so as to be more hydrophyllic, and more easily separated by conventional means, such as froth flotation. Ground coal particles are preconditioned by subjecting the pyrite to thiophilic bacteria adapted to the process, permitting the bacteria to alter the hydrophobicity of the pyrite particles. U.S. Pat. No. 4,822,413 discloses a process to extract metals from an ore containing one or more metallic sulphides using a leach liquor containing bacterially-generated ferric ions in order to effect metal sulfide dissolution. The metals removed are capable of dissolution in an acidic ferric sulfate solution (such as copper) or are more easily removed by subsequent processing (such as gold) as a result of exposure to the acidic ferric sulfate solution. Suitable bacteria, such as *Thiobacillus ferrooxidans* may be used to increase dissolution of metals in certain circumstances.

It has been proposed in U.S. Pat. No. 4,043,884 to upgrade the kerogen components of oil shale by leaching carbonate materials from the oil shale to produce a porous residue, forming a slurry of the residue with a reductive electrolytically active solution, and then subjecting the slurry to reductive electrolysis. The reduced residue is then more easily separated from the electrolyzed slurry.

The phenomenon of bacterio-electric leaching of metals from minerals combines two processes having a common feature—the bacterial oxidation of $Fe^{+2}$ in an acid solution. The first process is the oxidative leaching of pyritic minerals by iron-oxidizing bacteria (most commonly thiobacilli)—the so-called "pyrite cycle". The second process is the acceleration of the oxidation of reduced iron by iron-oxidizing thiobacilli by subjecting the process to an applied electric potential and the resulting current.

The pyrite cycle is a chain reaction in which ferric ions produced by bacterial oxidation react with the sulphur of a pyritic mineral in order to oxidize the pyrite. This oxidation releases ferrous ions, enabling the chemo-lithotrophic oxidation of the pyrite, and sustains the pyrite decomposition by regenerating $Fe^{+3}$ as the oxidizing agent. Pyrite oxidation and solubilization are limited by the concentration of ferric ions, and their accessibility to the mineral substrate. Both the concentration and accessibility of $Fe^{+3}$ ions are affected by the precipitation of bacterially-oxidized iron from solution as an $Fe^{+3}$ sulfato complex.

Precipitation usually occurs initially in the form of a metastable amorphous hydrated ferric sulfate. As illustrated in FIG. 1, the presence of jarosite directing cations and excess sulfate causes the $Fe^{+3}$ sulfato complex to be converted to a stable crystalline jarosite. Under more alkaline conditions the deposits comprise iron oxides and oxyhydroxides that are distinguishable from bacterial oxidation products.

Iron oxidizing bacteria are essential to the pyrite cycle by regenerating the soluble $Fe^{+3}$ lixiviant under acid conditions permitting extraction of metals from sulfide minerals and coal—conditions under which abiotic auto-oxidation of iron occurs slowly.

The acceleration of electro-oxidation of reduced iron by iron oxidizing thiobacilli occurs when an electro-oxidizable metal mineral liberates $Fe^{+2}$ under the influence of an electric potential. As illustrated in FIG. 2, in the presence of iron-oxidizing thiobacilli and in an acid environment, the flow of electric current and solubilization of iron is accelerated through depolarization of cathodic sites by bacterially oxidized iron in solution. When $Fe^0$ corrodes in an acidic aqueous environment, $Fe^{+2}$ passes into solution as electrons are transferred from $Fe^0$ at anodic sites to cathodic sites on the metal. The cathodic sites must be depolarized by a loss of electrons to an oxidizing agent in order for the process to continue. In an acid environment, hydrogen ions may serve as the oxidizing agent, however when $Fe^{+3}$ is present in such environment, it competes at the cathodes with $H^+$ for available electrons. If the $Fe^{+2}$ produced is oxidized by the thiobacillus, a chain reaction of iron oxidation and reduction occurs analogous to that of the pyrite cycle.

SUMMARY OF THE INVENTION

Pyrite is electrically conductive, therefore by subjecting pyritic materials to an applied potential in a galvanic cell containing an iron oxidizing microorganism, under acid conditions, solubilization of the pyritic component and liberation of associated cations from the mineral matrix will be enhanced by the combination of electro- and bacterial-oxidation. Electrophoretic migration of cations to the cathode in a galvanic cell may be utilized as a mechanism to separate and recover the cations. The process of the present invention may be utilized to separate valuable metals from low-grade ores or to remove ash metals and sulphur from pyrite coals.

The method of the present invention comprises adding iron-oxidizing bacteria and/or sulphur oxidizing bacteria to a slurry containing an ore body, inducing a voltage between a pair of electrodes across the slurry, and recovering metals from the ore body at one of the cathodes. Specifically, comminuted ores are mixed in a vessel with a lixiviant, such as pH 2.5 $H_2SO_4$, and a pair of platinum electrodes are suspended within the vessel. While the voltage required to produce the desired effect may depend upon various process conditions, application of a voltage of between about 1 and about 25 volts has been found to produce the electrophoretic separation of metals desired. While there is no process limitation for a maximum voltage applied, cost considerations will limit the maximum voltage to a reasonably low level e.g., less than 100 volts. It has been found that the addition of various salts to the reaction components can substantially increase conductivity of the reaction matrix, and thereby increase the metal recovery. For example, the addition of sulfates of lithium, magnesium and aluminum will increase the conductivity.

BRIEF DESCRIPTION OF THE DRAWINGS

FIG. 6 is a schematic representation of a galvanic sandwich;

FIG. 7 is a schematic representation of metal deposition in concentric zones about the cathode of the device of FIG. 6.

DETAILED DESCRIPTION OF THE INVENTION

Figure 1:
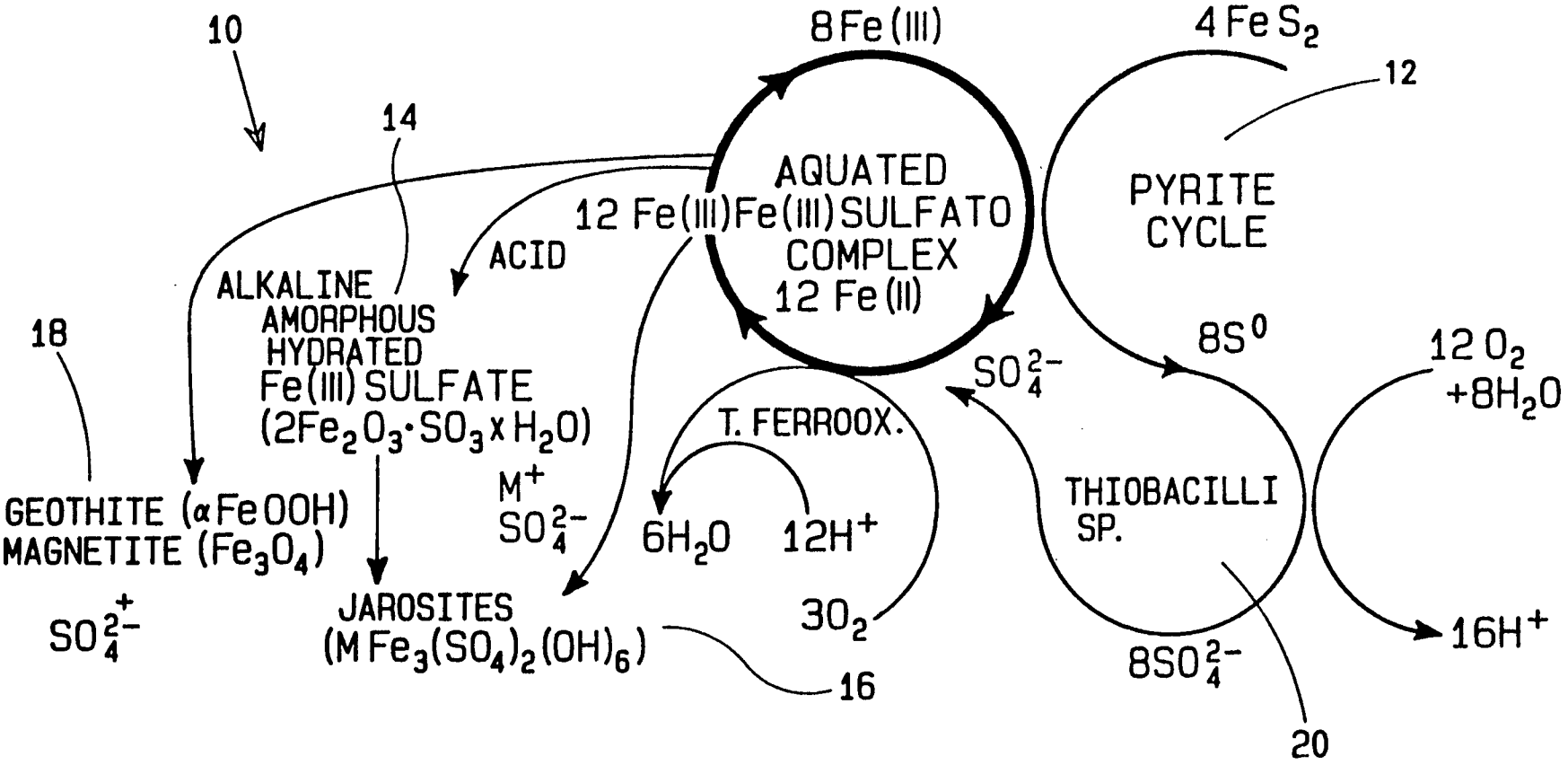
FIG. 1 is a diagramatic representation of the relationship of sulfate to pyrite leaching and the formation of oxidized iron sediments.
Figure 2:
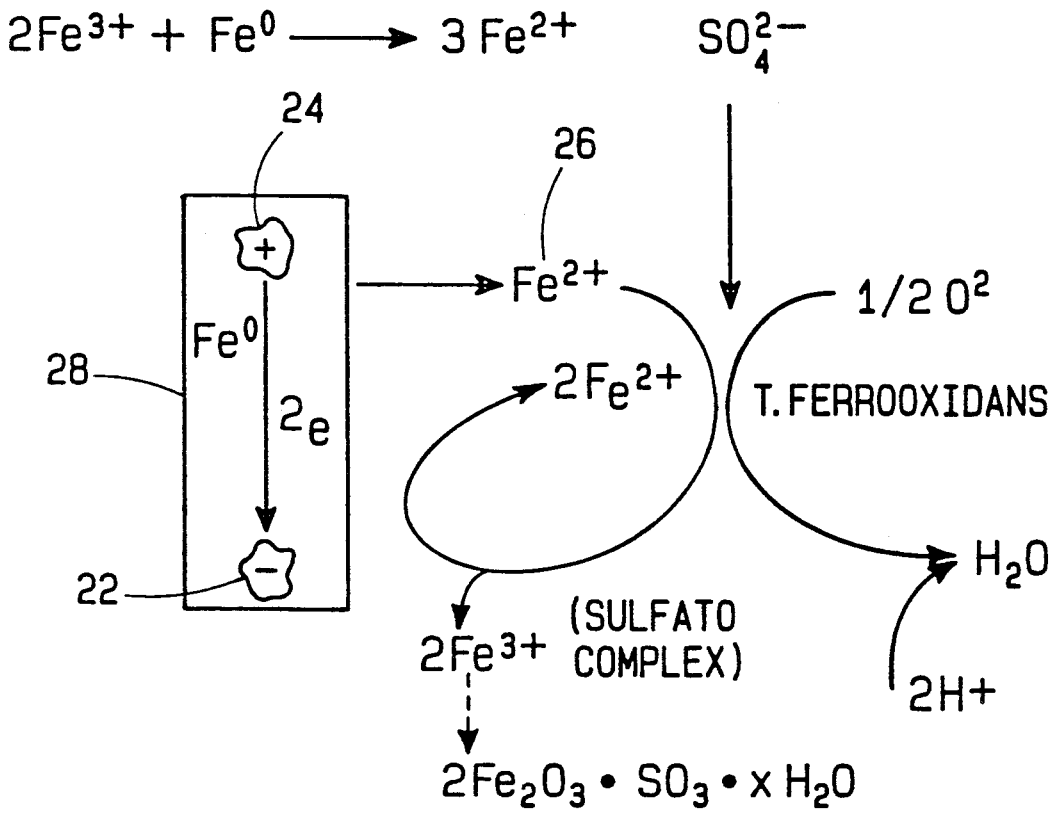
FIG. 2 is a diagramatic representation of the corrosion of steel by iron oxidizing bacteria.

FIGS. 1 and 2 illustrate schematically separate processes involved in the present invention. FIG. 1 represents the relationship of sulfate to pyrite leaching and the formation of oxidized iron sediments by iron oxidizing bacteria such as *Thiobacillus ferrooxidans*. Ferric ions produced by bacterial oxidation in the pyrite cycle 12 react with the sulphur of a pyritic mineral to oxidize it, releasing $Fe^{+2}$ for the chemo-lithotrophic oxidation and maintains pyrite composition by regenerating the $Fe^{+3}$ oxidant. Pyrite oxidation and solubilization are limited by the concentration of the ferric oxidizing agent and its accessibility to the mineral substrate. Precipitation usually occurs as an amorphous-hydrated ferric sulfate 14, however the presence of jarosite-directing cations and excess sulfate causes the $Fe^{+3}$ sulfato complex to be converted into a stable jarosite 16. Under alkaline conditions iron oxides and oxyhydroxide 18 are formed. Iron oxidizing bacteria 20 are essential to the process by regenerating the soluble $Fe^{+3}$ leaching agent which permit extraction of metals from sulfide minerals and coal. Without such bacteria the $Fe^{+3}$ sulfato complex is converted into magnetite or goethite, FIG. 2 illustrates the electro-oxidation of a metal (iron) under the influence of an electric potential. The flow of electric current and solubilization of iron is accelerated through depolarization of cathodic sites 22 by bacterially-oxidized iron in an acid environment. As electrons are transferred from $Fe^0$ at an anode 24 to a cathode 22, $Fe^{+2}$ 26 passes into solution. If the $Fe^{+2}$ is oxidized by the bacteria, a chain reaction of iron oxidation and reduction occurs and is self-sustaining, modulated by the precipitation of the typical sediments of chemo-lithotrophic iron oxidation. The reaction is driven by applying an external voltage to the system, thereby accelerating dissolution of the metal, and forming more $Fe^{+2}$ for bacterial oxidation, which in turn causes an increased accumulation of the $Fe^{+3}$ sediment. While an apparatus illustrated in FIG. 2 involves, for instance, a metal (iron) coupon 28 to conduct the electric potential, the process can be driven if an electrically-conductive ore body is suspended in an appropriate galvanic cell. For example, because pyrite is electrically conductive, the pyritic component of a mineral contained within a galvanic cell having an iron-oxidizing microorganism therein, under acid conditions, may be solubilized by a combination of electro- and bacterial-oxidation, with a concurrent liberation of cations retained within the mineral matrix. Electrophoretic migration of cations to the cathode of the galvanic cell assists collection of the separated cationic metals. While the metallic cations of interest migrate to the cathode, their associated anion (usually sulfate) will likewise migrate. The metals may be separated by conventional means after being liberated from the ore body.

EXAMPLE 1

Figure 3:
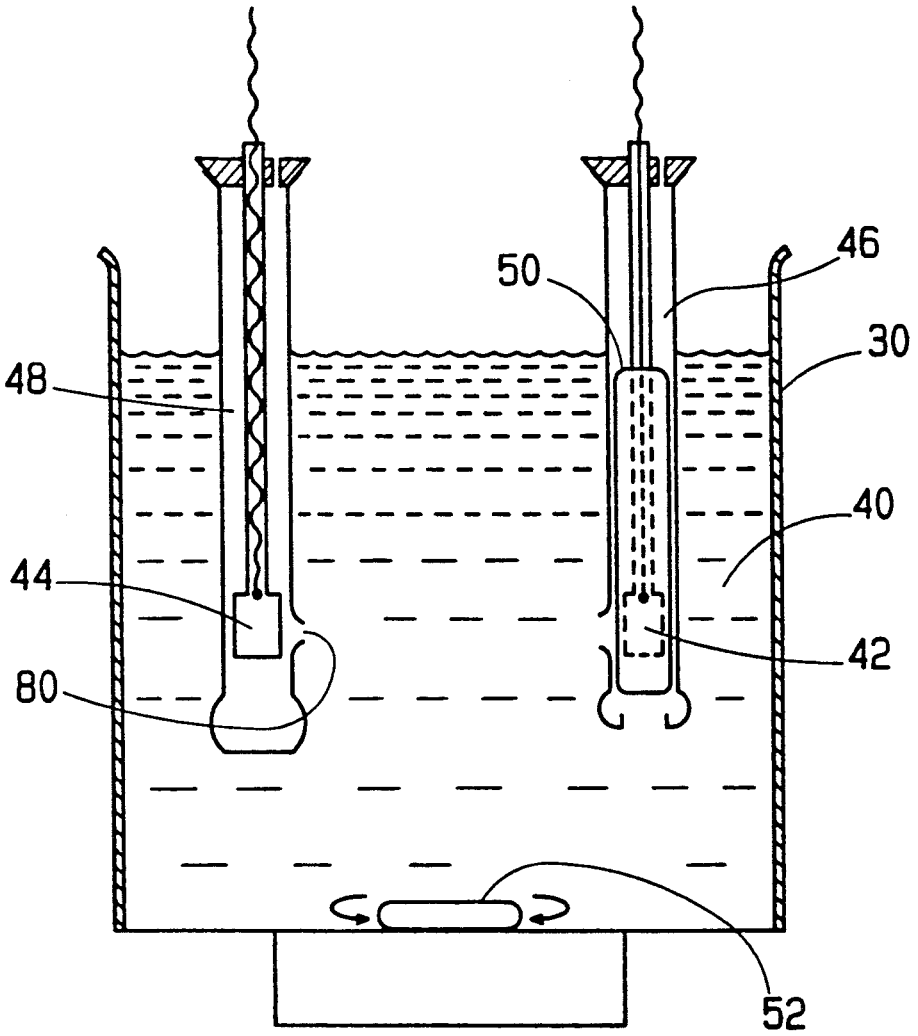
FIG. 3 is a schematic representation of the bacterioelectric leaching apparatus of the present invention.
Figure 4:
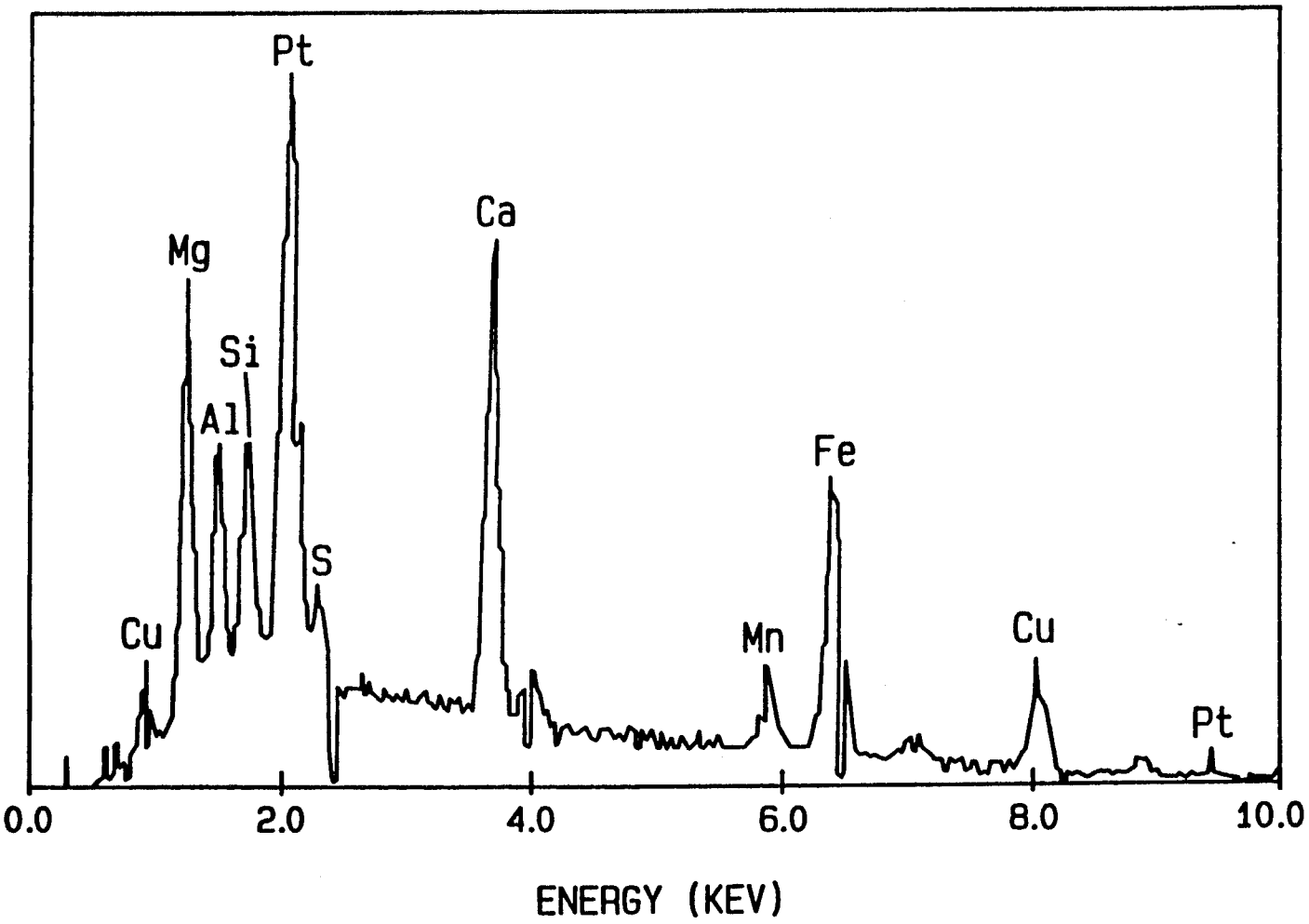
FIG. 4 is a graphic representation of metal deposits on the cathode of the apparatus of FIG. 3.

The apparatus of FIG. 3 demonstrates the bacterioelectric extraction of metals from ore bodies. An appropriate container 30, such as a glass beaker, is filled with a leaching agent 40, in this case sulfuric acid at a pH of from about 0.8 to about 4.5. It has been found that in the apparatus of FIG. 3 a pH of about 2.5 is preferable. An anode 42 and cathode 44 are suspended within the lixiviant, with the electrodes retained within chambers 46, 48 respectively. Both electrodes in the examples set forth herein are constructed of platinum (the source of the platinum recovered and illustrated in FIG. 4. Powdered mineral specimens are compacted against the anode within chamber 46 and then wrapped in ashless filter paper 50. The liberated metals from the ore are collected on the cathode 44 or in the surrounding cathode chamber 48. It should be understood that the metals collected may be removed from solution at any point in their migration between the anode and cathode, as with filters. The leaching agent 40 is preferably agitated, as by an air-driven magnetic stirrer 52. The metals recovered on the cathode are illustrated in FIG. 4—the ordinant of this Figure is not delineated in definitive units of measure, as the graphic representation illustrates merely the relative quantities of the various metals recovered.

Figure 5:
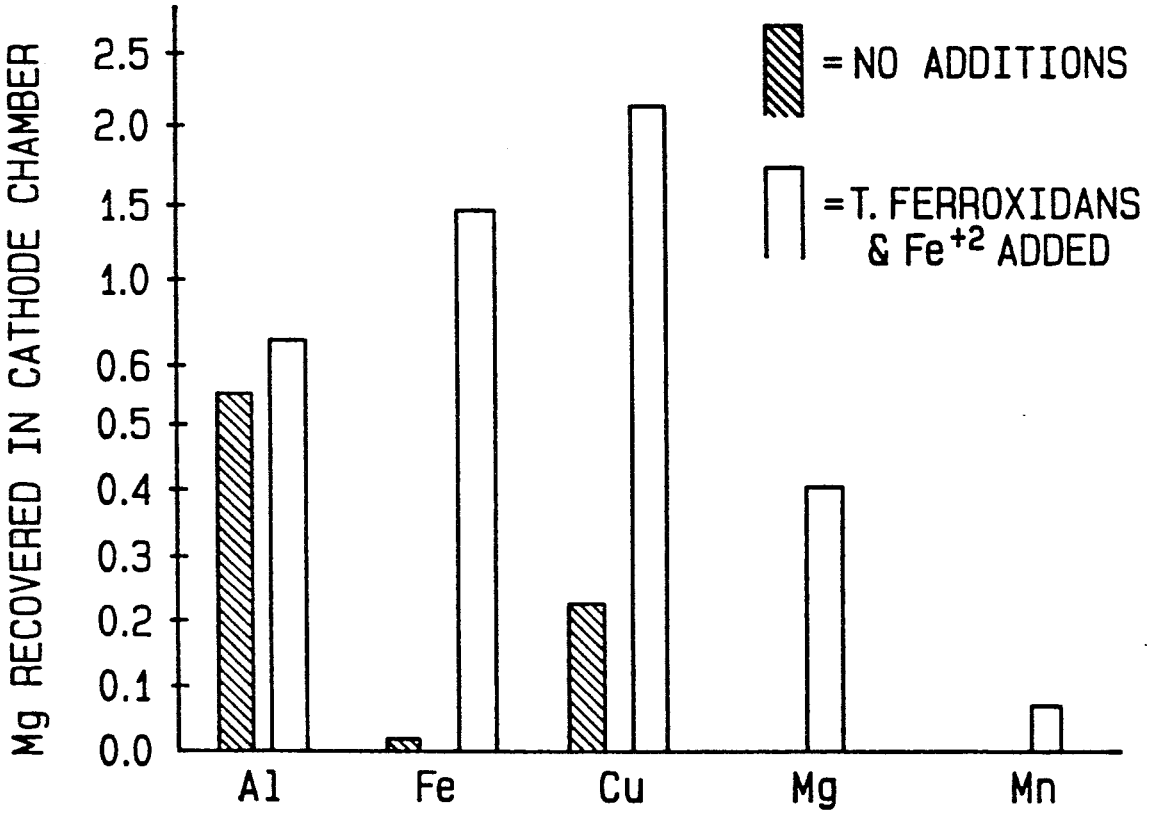
FIG. 5 is a graphic representation of galvanic separation of metals from a copper ore.

The addition of soluble iron and iron oxidizing microorganisms (*Thiobacillus ferrooxidans*) to the ore prior to extraction of cationic metals results in enhanced recovery of copper and other cations in the iron sediment collected in the cathode chamber. The results illustrated in FIG. 4 are obtained by analyzing for metals on the surface of the platinum electrode. In FIG. 5, the metals were collected with filters, dried and weighed. The apparatus of FIG. 3 was operated for 24 hours under the following process parameters:

1 gm powdered ore
350 mls $H_2SO_4$
pH 2.5
$5\times10^{10}$ cells *Thiobacillus ferrooxidans*

10 volts applied 10 mg $FeSO_4$ $7H_2O$

FIG. 5 illustrates the quantities of five metals recovered in the apparatus of FIG. 3 with and without the addition of iron oxidizing thiobacilli and soluble iron. The apparatus was operated for 72 hours at 10 volts. One gram of powdered ore was pretreated by shaking for 2 days in 50 mls of pH 2.5 $H_2SO_4$, containing $5\times10^{10}$ *T. ferrooxidans* cells and 10 mg $FeSO_4$ $7H_2O$ solution. In each case, the amount recovered with such additions was greater than that without.

Galvanic metal recovery from all coals using the process of FIG. 3 is not uniformly enhanced by the presence of iron oxidizing microorganisms. However, these results indicate that metal recovery from certain coals is consistently enhanced with the bacterio-electric process disclosed above.

EXAMPLE 2

PSOC 667, an Iowa subbituminous coal with approximately 13% total sulphur and 4.5% pyritic sulphur, was analyzed in the apparatus of FIG. 3. 0.75 grams of powdered coal was added to the anode chamber, with or without added microorganisms. The container was filled with 200 ml of pH 2.5 $H_2SO_4$ and the apparatus operated at 10 volts for 64 hours. Sediments were collected separately from the cathode and main chambers. Solutes were obtained by evaporation of the filtered lixiviant. 190.5 mg of solids were recovered from the cathode and main chambers in both soluble and suspended form (which does not include materials plated on the cathode, consisting primarily of iron, copper, nickel and sulphur). The 190.5 mg of recovered solids contained approximately 66 mg of metals, distributed as indicated in Table 1.

TABLE 1

| | Distribution of Metals Leached from PSOC Coal (Mg) | | | | | | | | | |
|---|---|---|---|---|---|---|---|---|---|---|
| | Total Solids | Fe | Ca | Al | K | Si | Cu | S | Atom Fe | Atom S |
| Galvanic Process | 190.5 | 54.02 | 11.03 | 0.71 | 0.15 | 0.43 | 0.07 | 40.51 | 0.967 | 1.24 |
| Bacterio-electric process | 239.9 | 91.00 | 1.53 | 0.72 | — | 0.04 | 0.04 | 48.60 | 1.592 | 1.489 |

By comparison, leaching of the PSOC 667 coal with combined bacterial ($5\times10^{10}$ cells *T. ferrooxidans* added) and electric leaching separated approximately 239 mg of recovered solids, with approximately 93.3 mg of metals contained therein. While the combined bacterial and electric treatment results in enhanced metal extraction from PSOC 667 coal, the accompanying increased precipitation of iron is not an indicator of increased recovery of sulphur, which would be expected if bacterial oxidation had released iron from pyrite. While not attempted herein, Applicants believe that removal of sulphur as well as metals from such coal samples would be enhanced by providing mixed bacterial populations having the ability to readily oxidize elemental sulphur as well as reduced iron. Such mixed bacterial populations may include other species of Thiobacillus, such as *T. thiooxidans*, and other microbes capable of metabolism in an acidic environment, such as Acidophillium sp. and Leptospirillium sp. Also, bacteria capable of stimulating iron and sulphur oxidixing bacteria may be added.

In order to determine the nature of the cationic metals extracted from coal by the inventive process, the apparatus of FIG. 3 was modified to better determine the results of the process.

EXAMPLE 3

A galvanic sandwich, illustrated in FIG. 6, comprises a container or dish 54, having a membrane filter 56 atop a cellulose pad 58. The pad 58 is soaked with a dilute sulfuric acid solution and either overlies or surrounds a stainless steel anode 60. The anode 60 is maintained in contact with the ore specimen 70 within the pad. In the apparatus of FIG. 6, approximately 0.3–0.4 gm of powdered ore was utilized. A platinum cathode 72 rests on the surface of the membrane filter 56 below a layer of paraffin 74 held in place by a lid 76 of container 54. The membrane filter is preferably comprised of cellulose acetate. The sulfuric acid is provided at a pH of from about 0.8 to about 4.5, preferably about 2.5, and electric current was provided for 20 hours at 10 volts. Electrophoretic separation of the metals present in the ore specimen are deposited in zones 78 concentric to the cathode 72 (FIG. 7). The various zones 78 may be cut from the membrane filter 56 and analyzed by appropriate techniques to determine relative amount of the various metals.

It was determined that the zone closest to the cathode contained mostly nickel, while the next closest zone contained mostly nickel and chromium, the next contained primarily iron and sulphur and the farthest from the cathode contained copper and chromium. While the technique of FIGS. 6 and 7 does not permit complete separation of the metals recovered from a coal specimen, it does provide for partial separation and permits a means to better appreciate the metal complexes that are formed.

Significant amounts of copper and zinc are present in the sediment from the bacterio-electric treatment of FIG. 3, but these elements are not collected on the cathode port membrane of a corresponding leaching system without iron oxidizing bacteria added thereto.

EXAMPLE 4

An Illinois #6 coal (PSOC 1322) having about 1.28% pyritic sulphur was subjected to bacterio-electric leaching in the vessel of FIG. 3. It was determined that the cellulose or cellulose acetate filters placed across the cathode port 80 were the site of sediment deposition for some coals. Although the sediment obtained by galvanic leaching with addition of the iron-oxidizing microorganisms differs from the abiotic galvanic sediment having more of the amorphous hydrated $Fe^{+3}SO_4$, both appear to be inorganic polymers (polyelectrolytes) based on their retention by the filter. Sediments were easily separated by scraping from the cellulose acetate or ashless filter paper and analyzed for metal content.

TABLE 2

| | | Distribution of Metals Leache from PSOC 1322 Illinois #6 Coal (Mg) | | | | | | | | | | |
|---|---|---|---|---|---|---|---|---|---|---|---|---|
| | | Al | Si | S | Ca | Mn | Fe | Cu | Zn | K | Br | TOTAL |
| Bac- | wt % | 1.04 | 0.25 | 4.53 | 0.19 | 0.89 | 92.69 | 0.16 | 0.25 | — | — | 100 |
| terized | atomic % | 2.06 | 0.47 | 7.54 | 0.25 | 0.86 | 88.48 | 0.13 | 0.21 | — | — | — |
| No Bac- | wt % | — | 1.16 | 1.01 | 0.24 | 1.60 | 92.07 | — | — | 0.44 | 3.48 | 100 |
| teria | atomic | — | 2.78 | 1.75 | 0.38 | 1.60 | 91.01 | — | — | 0.62 | 2.41 | — |

The elemental analysis set forth in Table 2 indicates that significant amounts of copper and zinc are present in the sediment from the bacterio-electric process but are not collected on the cathode port membrane when the process is run without iron-oxidizing bacteria. Applicants believe that either the additional $Fe^{+3}$ provided by way of bacterial action or by direct bacterial action on copper and zinc minerals, results in greater release of copper and zinc from the bound mineral form.

Because of the concern for sulphur emissions resulting from the burning of coal, it is highly desireable to remove a significant portion of the sulphur in high-sulphur coals prior to burning.

EXAMPLE 5

Figure 8A:
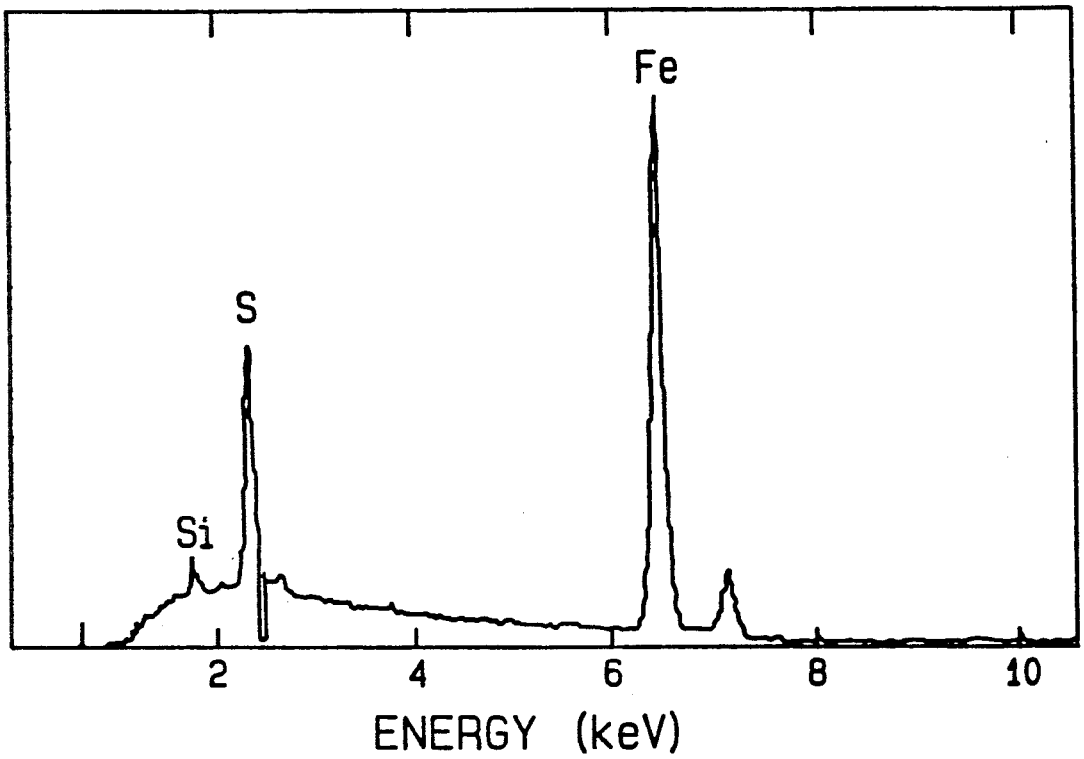
FIGS. 8(*a* and *b*) are graphic representation of metal recovery from coal in a galvanic sandwich of FIG. 6.
Figure 8B:
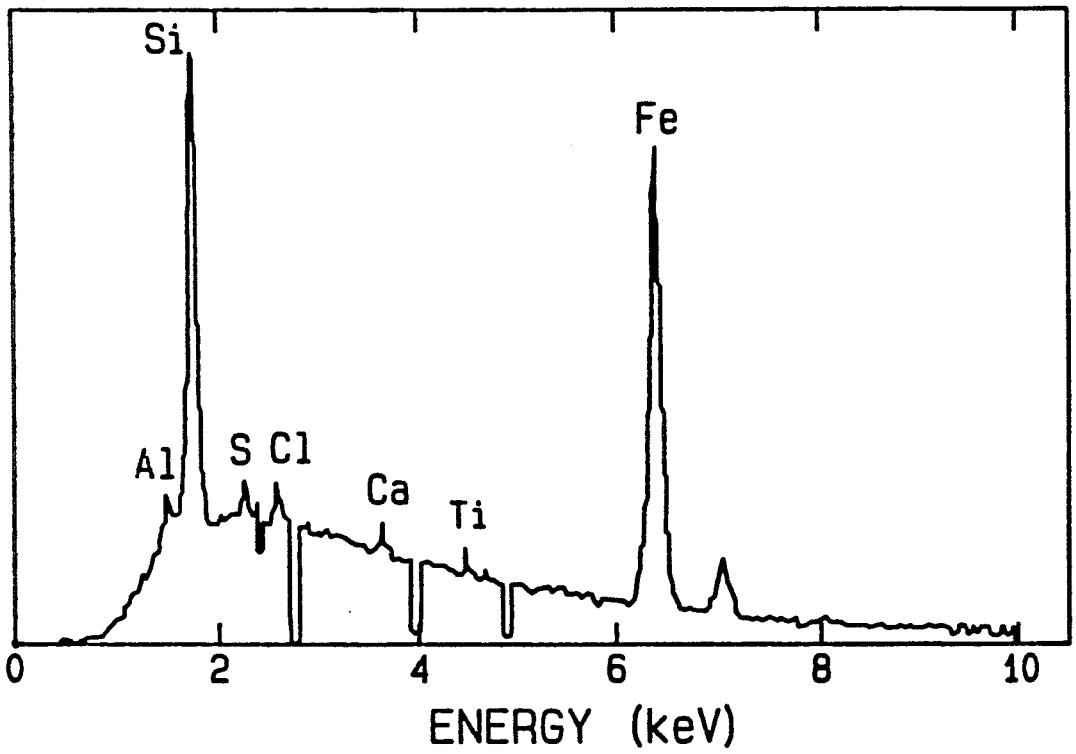

Powdered PSOC 667 Iowa subbituminous coal containing about 4.5% pyritic sulphur was placed at the anode of a galvanic sandwich of FIG. 6. The system was operated at 10 volts for 48 hours. Analysis of the bacterially-sedimented iron (FIG. 8A) is distinguishable from iron oxidized abiotically (FIG. 8B) by the relative amounts of sulphur recovered. The bacterially oxidized $Fe^{+3}$ complex migrates toward the cathode where it forms a distinct zone that differs from the zone containing $Fe^{+3}$ complexes formed by abiotic oxidation, as set forth above. A larger proportion of sulphur is found in deposits formed on cellulose acetate filters from iron oxidized by *Thiobacillus ferrooxidans* then that oxidized abiotically. The data in Table 2 above indicate that the bacterized leach treatment yields a sediment with a significantly greater amount of sulphur than an abiotic treatment. Presumably, recovery of nonmetallic constituents such as sulphur, silicon and phosphorous are complexed with heavier cations recovered by the process.

The process of the present invention is useful to recover sulphur from high-sulphur coals, such as the PSOC 667 sample of Table 1. This coal contains approximately 13% total sulphur and 4–5% pyritic sulphur. As illustrated in Table 1, the total amount of sulphur recovered using the bacterio-electric process of the present invention is approximately 20% greater than by the use of the galvanic process only.

While the process of the present invention has been disclosed herein in a relatively small laboratory apparatus, such processes are intended merely to demonstrate the feasibility of the inventive process. It is contemplated that the process can be most economically carried out in one of three environments: (1) an in situ process wherein the bacteria and electric potential are introduced directly into a subterranean ore body; (2) after an ore body is mined, precious metals or non-precious metals (including hazardous metals) may be recovered from a slurry either prior to refining or as a component of a refining process; or (3) prior to burning, sulphur may be removed from a slurry of coal particles.

It is believed that areas experiencing soil contamination from metals resulting from dumping may be cleansed by the process of the present invention. For example, radionuclides and hazardous organics preferentially complexed with metals subject to removal by this process may be removed from contaminated areas. Also, products of combustion such as fly ash and baghouse dust removed from industrial processes may be cleansed of specific metals by this process.

It is to be understood that while the process of the present invention has been described with reference to an acidic environment, the process is equally susceptible to operation in neutral and basic environments. The limiting factor is the isolation of suitable bacteria having the capability to complex with the desired metals. Applicants have noted galvanic metal extraction in lixiviants having a pH as high as 13.0.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. A method of removing metals from fossil fuels, comprising:
   a. forming and agitating a fossil fuel slurry containing the fossil fuel and sulfuric acid at a Ph of about 2.5 in a vessel;
   b. treating the slurry with the iron-oxidizing microorganism, *Thiobacillus Ferrooxidans;*
   c. inserting a pair of electrodes comprising an anode and a cathode into the vessel;
   d. applying a voltage of about 10 volts between the electrodes across at least a portion of the vessel to electrolytically dissolve and redeposit the metals; and
   e. recovering the electro-deposited metals between the anode and the cathode.

2. The method of claim 1, further comprising increasing the conductivity of the slurry by adding a sulfate salt to the slurry, wherein the sulfate salt is selected from the group consisting of lithium magnesium or aluminum.

3. A method of removing metals from coal prior to combustion of the coal, comprising:
   a. forming an acidic slurry of the coal and sulfuric acid at a Ph of about 2.5;
   b. adding the iron-oxidating bacteria, *Thiobacillus ferrooxidans* to the slurry;
   c. inducing a voltage of about 10 volts across the slurry between a pair of electrodes; and
   d. recovering the metals adjacent one of the electrodes.

4. A method of removing iron pyrite from fossil fuels, comprising:
   a. forming a fossil fuel slurry containing the iron pyrite in mixture with sulfuric acid solution at a Ph of about 2.5 and an iron-oxidizing microorganism including *Thiobacillus ferrooxidans;*
   b. electrolytically dissolving the iron pyrite at anodic potential in the presence of the iron-oxidizing microorganism to form $Fe^{+2}$ in sulfate solution. The $Fe^{+2}$ being oxidized to $Fe^{+3}$ by the action of the iron-oxidizing microorganism;
   c. electrolytically converting $Fe^{+3}$ at cathodic potential to $Fe^{+2}$ and to iron metal; and
   d. recovering the iron metal from the slurry.

* * * * *